US009122964B2

(12) United States Patent
Krawczewicz (10) Patent No.: US 9,122,964 B2
(45) Date of Patent: Sep. 1, 2015

(54) BATTERYLESS STORED VALUE CARD WITH DISPLAY

(76) Inventor: Mark Krawczewicz, Annapolis, MD (US)

(*) Notice: Subject to any disclaimer, the term of this patent is extended or adjusted under 35 U.S.C. 154(b) by 247 days.

(21) Appl. No.: 13/108,949

(22) Filed: May 16, 2011

(65) Prior Publication Data

US 2011/0279242 A1 Nov. 17, 2011

Related U.S. Application Data

(60) Provisional application No. 61/334,748, filed on May 14, 2010.

(51) Int. Cl.
*H04Q 5/22* (2006.01)
*G06K 19/07* (2006.01)
*G06K 19/077* (2006.01)

(52) U.S. Cl.
CPC ........ *G06K 19/0723* (2013.01); *G06K 19/0701* (2013.01); *G06K 19/07703* (2013.01)

(58) Field of Classification Search
USPC .................. 340/10.1–10.6, 572.1–572.9; 235/375–385
See application file for complete search history.

(56) References Cited

U.S. PATENT DOCUMENTS

| 4,582,985 | A * | 4/1986 | Lofberg | 235/380 |
|---|---|---|---|---|
| 4,746,787 | A * | 5/1988 | Suto et al. | 235/379 |
| 5,276,903 | A * | 1/1994 | Shinagawa | 712/37 |
| 5,600,459 | A * | 2/1997 | Roy et al. | 349/42 |
| 6,360,954 | B1 * | 3/2002 | Barnardo | 235/492 |
| 6,476,718 | B1 | 11/2002 | Cartwright et al. | |
| 6,736,316 | B2 * | 5/2004 | Neumark | 235/383 |
| 6,782,275 | B2 * | 8/2004 | Mountain et al. | 455/558 |
| 6,876,319 | B2 * | 4/2005 | Webster et al. | 341/143 |
| 6,924,781 | B1 * | 8/2005 | Gelbman | 345/85 |
| 7,233,250 | B2 * | 6/2007 | Forster | 340/572.8 |
| 7,337,975 | B2 * | 3/2008 | Halope | 235/492 |
| 7,407,110 | B2 * | 8/2008 | Davis et al. | 235/472.02 |
| 7,427,201 | B2 * | 9/2008 | Meisner | 439/48 |
| 7,543,156 | B2 * | 6/2009 | Campisi | 713/186 |
| 7,584,006 | B2 * | 9/2009 | Paul et al. | 700/83 |
| 7,584,888 | B2 * | 9/2009 | Stephenson et al. | 235/383 |
| 7,584,896 | B2 | 9/2009 | Warther et al. | |
| 7,629,206 | B2 * | 12/2009 | Haase et al. | 438/149 |
| 7,652,359 | B2 * | 1/2010 | Takayama et al. | 257/679 |
| 7,693,930 | B2 * | 4/2010 | Karaki | 708/704 |
| 7,845,569 | B1 | 12/2010 | Warther et al. | |
| 7,913,908 | B2 * | 3/2011 | Gelbman | 235/451 |
| 7,917,769 | B2 * | 3/2011 | Campisi | 713/186 |
| 8,079,904 | B2 * | 12/2011 | Griswold et al. | 463/25 |
| 8,136,725 | B2 * | 3/2012 | Yamazaki | 235/380 |

(Continued)

FOREIGN PATENT DOCUMENTS

GB 2067467 A * 7/1981 ............ B42D 15/02
JP 2011203929 A * 10/2011

*Primary Examiner* — Paul Obiniyi
(74) *Attorney, Agent, or Firm* — 24IP Law Group; Timothy R DeWitt (57) ABSTRACT

A stored value card such as a transit card, college meal plan card, other card such as a credit card, coupon redemption card or rewards/awards card has within it an integrated thin film flexible display and has RFID and security capabilities. In a preferred embodiment of a transit card or stored value card in accordance with the present invention, the display shows a remaining balance on the card. Still other aspects, features, and advantages of the present invention are readily apparent from the following detailed description, simply by illustrating a preferable embodiments and implementations.

15 Claims, 7 Drawing Sheets

(56) References Cited

U.S. PATENT DOCUMENTS

| | | | |
|---|---|---|---|
| 8,184,357 B2 * | 5/2012 | Yeo et al. | 359/290 |
| 2005/0065884 A1 * | 3/2005 | Capurso et al. | 705/41 |
| 2005/0216546 A1 * | 9/2005 | Karaki | 708/702 |
| 2005/0270752 A1 * | 12/2005 | Credelle et al. | 361/736 |
| 2006/0082564 A1 * | 4/2006 | Poliankine et al. | 345/204 |
| 2006/0149960 A1 * | 7/2006 | Paul et al. | 713/100 |
| 2007/0029391 A1 * | 2/2007 | Halope | 235/492 |
| 2007/0094523 A1 * | 4/2007 | Hsieh | 713/300 |
| 2007/0161263 A1 * | 7/2007 | Meisner | 439/48 |
| 2007/0220272 A1 * | 9/2007 | Campisi et al. | 713/186 |
| 2007/0220273 A1 * | 9/2007 | Campisi | 713/186 |
| 2008/0067247 A1 * | 3/2008 | McGregor et al. | 235/439 |
| 2008/0068131 A1 * | 3/2008 | Cargonja et al. | 340/10.1 |
| 2008/0205010 A1 * | 8/2008 | Haase | 361/763 |
| 2008/0206914 A1 * | 8/2008 | Haase et al. | 438/34 |
| 2008/0207077 A1 * | 8/2008 | Haase | 445/22 |
| 2008/0225180 A1 * | 9/2008 | Callway et al. | 348/725 |
| 2008/0314976 A1 * | 12/2008 | Capurso et al. | 235/380 |
| 2008/0314983 A1 * | 12/2008 | Capurso et al. | 235/441 |
| 2009/0134223 A1 | 5/2009 | Matthews et al. | |
| 2009/0146804 A1 * | 6/2009 | August et al. | 340/539.13 |
| 2009/0152364 A1 | 6/2009 | Spivey, Jr. | |
| 2009/0199004 A1 * | 8/2009 | Krawczewicz et al. | 713/172 |
| 2009/0206994 A1 | 8/2009 | Johnson, Jr. et al. | |
| 2009/0218395 A1 | 9/2009 | Chien et al. | |
| 2009/0254438 A1 | 10/2009 | Johnson, Jr. et al. | |
| 2009/0289762 A1 | 11/2009 | Tassy et al. | |
| 2009/0295549 A1 * | 12/2009 | Han et al. | 340/10.51 |
| 2009/0295749 A1 | 12/2009 | Sato et al. | |
| 2009/0303400 A1 * | 12/2009 | Hou et al. | 349/12 |
| 2009/0309736 A1 * | 12/2009 | Heurtier | 340/572.8 |
| 2009/0321516 A1 | 12/2009 | Yang | |
| 2010/0019905 A1 | 1/2010 | Boddie et al. | |
| 2010/0033307 A1 | 2/2010 | Narendra et al. | |
| 2010/0033310 A1 | 2/2010 | Narendra et al. | |
| 2010/0039265 A1 | 2/2010 | Spivey, Jr. | |
| 2010/0052908 A1 | 3/2010 | Doan et al. | |
| 2010/0066497 A1 | 3/2010 | Lim et al. | |
| 2010/0079416 A1 * | 4/2010 | Chung et al. | 345/204 |
| 2010/0117800 A1 * | 5/2010 | Li et al. | 340/10.1 |
| 2011/0090046 A1 * | 4/2011 | Johnson et al. | 340/5.64 |
| 2011/0279242 A1 * | 11/2011 | Krawczewicz | 340/10.6 |
| 2012/0109735 A1 * | 5/2012 | Krawczewicz et al. | 705/14.27 |
| 2012/0211569 A1 * | 8/2012 | Krawczewicz et al. | 235/492 |
| 2012/0217303 A1 * | 8/2012 | Krawczewicz et al. | 235/488 |

* cited by examiner

BATTERYLESS STORED VALUE CARD WITH DISPLAY

CROSS-REFERENCE TO RELATED APPLICATIONS

The present application claims the benefit of the filing date of U.S. Provisional Application Ser. No. 61/334,748 entitled "Batteryless Stored Value Card with Display" filed on May 14, 2010.

The above cross-referenced related application is hereby incorporated by reference herein in its entirety.

STATEMENT REGARDING FEDERALLY SPONSORED RESEARCH OR DEVELOPMENT

None.

BACKGROUND OF THE INVENTION

1. Field of the Invention

The present invention relates to generally to RFID cards, and more specifically, to a batteryless RFID card having a display.

2. Brief Description of the Related Art

In recent years, RFID cards are tags have become increasingly prevalent. The have been incorporated into many diverse fields. For example, RFID readers and cards have been incorporated into bill/coin acceptors (U.S. Pat. Pub. No. 2009/0321516 and 2009/0218395), tracking systems (U.S. Pat. Pub. No. 2010/0066497 and 2010/0019905), authenticatable badges (U.S. Pat. Pub. No. 2009/0289762), commodity displays (U.S. Pat. Pub. No. 2009/0295749) and luggage tags (U.S. Pat. No. 7,845,569). Advances have been made in some instances to provide RFID cards that receive power from a host device rather than having a battery incorporated into the card (U.S. Patent App. Pub. 2010/0033310, 2010/033307 and 2009/0206994).

Recently, efforts have been made to incorporate displays into RFID cards and tags. For example, in U.S. Patent App. Pub. No. 2010/0052908 entitled "Transient State Information Display in an RFID Tag," a display is incorporated into an RFID card to show a transient state such as an age of a product. In the preferred embodiment disclosed in that patent, a card or tag reader provides a current date while the card provides the expiration date of the product. Based on a comparison of those two, an LED is illuminated to reflect the status of the product. The disclosure indicates that a variety of other types of displays may be used and also that the card may be active or passive. In another example, U.S. Patent App. Pub. No. 2010/0079416 entitled "Radio Frequency Identification (RFID), Display Pixel, and Display Panel and Display Apparatus Using RFID Display Pixel" discloses an RFID tag connected to an "RFID pixel" or plurality of "RFID pixels." Another example is described in U.S. Patent App. Pub. No. 2009/0309736 entitled "Multifunction Contactless Electronic Tag for Goods."

SUMMARY OF THE INVENTION

A stored value card such as a transit card, college meal plan card or other card such as a credit card has within it an integrated thin film flexible display and has RFID and security capabilities. In a preferred embodiment of a transit card or stored value card in accordance with the present invention, the display shows, for example, a remaining balance on the card, a coupon, an entertaining message, or a transaction status.

In a preferred embodiment, the present invention is a batteryless RFID card such as a stored value card or a security token. The batteryless RFID card comprises a housing, a processor, a near-field antenna and a display for displaying alpha-numeric information. When the card is brought into the proximity of a magnetic field of a card reader, power is inductively coupled to the near-field antenna of the card. The processor and display are solely powered by energy received through the near-field antenna, and alphanumeric information is displayed on the display using power from energy received through the near-field antenna and said displayed alphanumeric information is maintained on said display when said power from energy received through said near-field antenna is discontinued. In an embodiment in which the batteryless RFID card is a stored value card, a remaining monetary value is stored in memory on card and the displayed alpha-numeric information comprises a remaining monetary value. The memory may be processor memory or a separate memory chip also is powered solely by energy received through the near-field antenna. The batteryless RFID card may further comprise drive circuitry or chips. When secure transactions are desired, the processor may be a security processor. The display may be a bi-state display. In one embodiment, the display is a ten-digit alphanumeric display. The bi-state display, for example, may comprise an electrochromic display, an electro-phoretic display or an E-Ink display. In another embodiment, the batteryless RFID card also has a UHF antenna for reading data from the RFID card from distances greater than can be achieved with the near-field antenna.

In another embodiment, the present invention is a method for displaying a remaining monetary value on an RFID stored value card having a processor, a memory, a bi-state display and a near-field antenna. The method comprises the steps of coupling said RFID stored value card to an RFID reader through said near-field antenna, powering said processor with energy received through said near-field antenna, retrieving with said processor a remaining monetary value from said memory, calculating a new remaining monetary value with said processor based upon a transaction, storing said new remaining monetary value in said memory and displaying said new remaining monetary value on said bi-state display using energy received through said near-field antenna. The transaction may be one in which money is added or subtracted from the card such that a specified amount is added to or subtracted from the stored remaining monetary value.

In another embodiment, the present invention is a method for displaying alphanumeric information on an RFID card having a processor, a memory, a bi-state display and a near-field antenna. The method comprises the steps of coupling said RFID card to an RFID reader through said near-field antenna, powering said processor with energy received through said near-field antenna, conducting a secure transaction using said card and changing alpha-numeric information displayed on said display using energy received through said near-field antenna to display information reflecting a status of said secured transaction. The step of changing alphanumeric information displayed on said display may comprise changing displayed alphanumeric information multiple times to produce a scrolling or multiline message on said display. The step of changing alphanumeric information displayed on said display may comprises displaying a status of at least one of the following: a payment process, an authentication process, a cryptographic process, a mutual authentication process, a challenged response process, a coupon redemption process or an awards process. The step of changing alphanumeric information displayed on said display comprises displaying an entertainment message.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Preferred embodiments of the present invention will be described with reference to the drawings. A stored value card such as a transit card (FIG. 1A), college meal plan card or other card such as a pre-paid or other credit card (FIG. 1B) has within it an integrated thin film flexible display and has RFID and security capabilities. The card 100 has a housing 110 having a display window 112 in which there is a display 120. The card may have various types of information printed on either side of the card. Such information may include, for example, a trademark 130, descriptive information 140, a bank logo 150, a credit card number 160, an expiration date 170, a name 180 or a card type 190. Other types of information such an photos, pictures, address or telephone information, of course may also or alternatively be printed on the card.

Figure 1A:
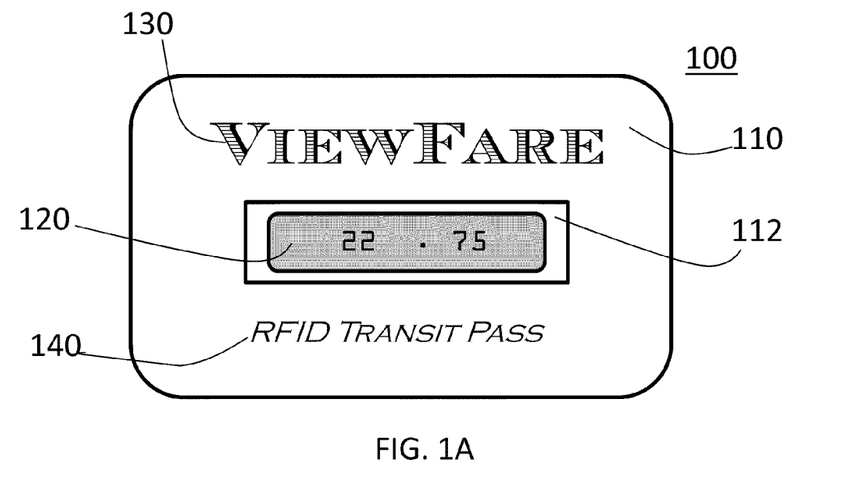
FIGS. 1A and 1B are diagrams of stored value cards in accordance with a preferred embodiment of the present invention.
Figure 1B:
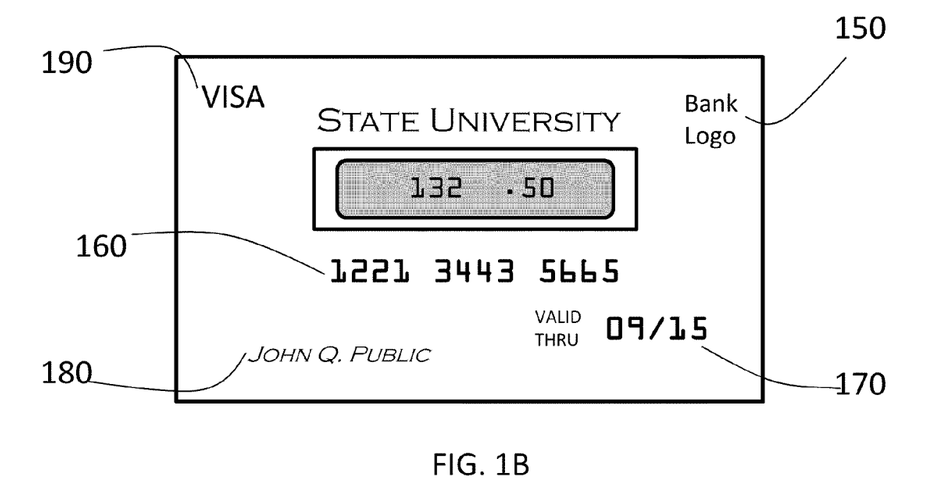

In a preferred embodiment of a stored value card in accordance with the present invention, the display shows a remaining balance on the card. In other card embodiments, the display can show many other items, such as an authentication status, a payment status or an entertaining message such as a horoscope or a message of the day. While coupled to a reader, the display also may be used to show a scrolling or multiple line message. The messages may be received from the reader or may be pre-stored in memory on the card.

Figure 5A:
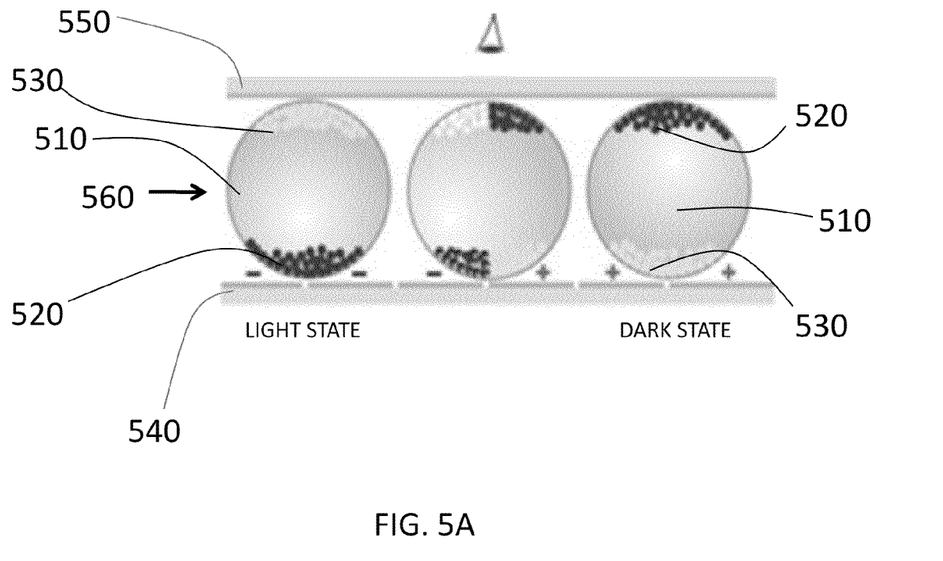
FIG. 5A is a cross sectional view of an E-ink bi-state display in accordance with a preferred embodiment of the present invention.

The card or tag may be encapsulated using commercially available techniques such as used by Vanguard Identification Systems, Inc. in Westchester, Pa. (see also, U.S. Pat. No. 7,584,896). The display in a preferred embodiment is a bi-state display that does not require power to maintain the display after each use. Rather, the display is changed at the time a transaction occurs. Further, the cards in a preferred embodiment of the present invention may be designed to be interoperable with existing contactless card readers and infrastructure. As shown in FIG. 5A, the display may be, for example, an electrophoretic layer or assembly comprised of a back plane, a top plane, and an electrophoretic material positioned in between the two. In a preferred embodiment, the bottom plane is an electrical circuit layer and the top plane is a transparent conductive plastic layer.

The display and support circuitry will integrate into standard ISO card with reverse capability with magnetic strip, contactless payment readers. The traditional cards have many known security vulnerabilities and this secure display card mitigates these security issues.

The secure payment card of the present invention has two way contactless communication with the payment terminal without the use of a battery. Data is transferred between the card and a reader via modulation in the inductive field. Additionally, the new technology utilizes a secure processor within the card to secure the interface, protect the data stored within the card, and authenticate the user to the card. The complete display and circuitry is encapsulated within the plastic of the card that can provisioned with any company and personalization branding or other printed information.

Figure 2A:
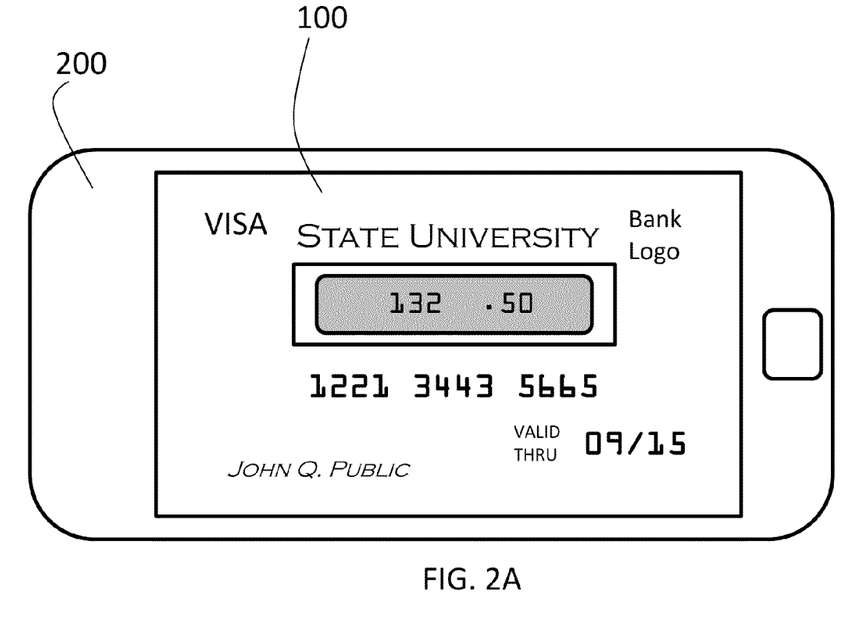
FIG. 2A is a diagram of an alternate embodiment of a card in accordance the present invention being used as a cryptographic unlocking key for a mobile phone or PDA device.
Figure 2B:
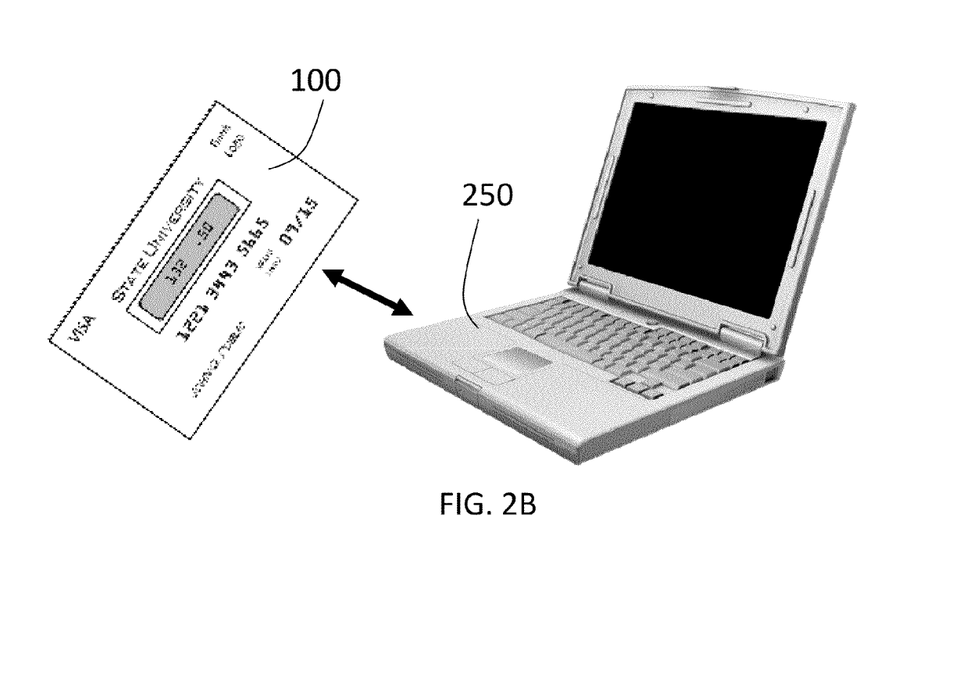
FIG. 2B is a diagram of an alternate embodiment of a card in accordance the present invention being used as a cryptographic unlocking key for a laptop computer or other portable device.

The new class of card has many applications, including but not limited to the following:

- as a stored value card for applications like transit fare card, college student meal plan card, or other similar applications (FIG. 1). These applications are designed to interact with traditional retail payment terminals or payment kiosks.
- as a cryptographic unlocking device "key" for a mobile phone or PDA device or with a laptop or desktop computer (FIGS. 2A and 2B). In both applications, the mobile device or computer acts as the communications link and hosts the secure payment portal running the payment application (i.e. airline website for ticket purchase).

In these two exemplary applications, the display card interaction occurs twice in the transaction. First, to execute a cryptographic challenge response to mutually authenticate the reader/card and to authenticate the user to the card. This process unlocks the cryptographic keys to verify the application running on the mobile phone or computer has not been modified. Second, the payment process is executed between the mobile phone or computer application and the bank or credit card authorization center. This session between the mobile application and the card authorization centers is secure using the session keys provided by the secure display card. Upon payment verification, a message will be sent to the card such as "APPROVED" to positively verify to the cardholder all steps of the transactions were secured and processed.

Mobile Payment Trends Driving this Proposed Architecture:

Recently, there has been a focus on developing mobile payment applications—with the objective of using the phone as a credit card. In connection with those efforts, NFC antennas within phones to interface with the payment terminal.

The main deficiency with this concept is the cell phones' applications and keys stored on the phones to unlock the payment application are not protected. What is needed to address this shortfall is a card to unlock, authenticate, and verify a transaction of the cell phone payment application and used as a communication channel.

Traditional payment interfaces like magnetic strip or contact 7816 card readers are not optimal or practical for integration into mobile devices like cell phones. Recently, NFC (14443) receivers have been embedded in the next gen phones.

An embodiment of the present invention utilizes the NFC in a novel way to bridge credit/debit cards with mobile phones for secure transactions, as shown in FIGS. 2A and 2B. FIG. 2A illustrates a card 100 of the present invention adjacent a mobile phone 200 while FIG. 2B shows a card 100 adjacent a laptop computer 250. In addition, this same card technology will operate as a standard card, or stored value card for applications such as; parking, college meal plane cards, season ticket cards, and well as numerous not-thought-of -yet applications.

This new class of card inlay can easily embed in ISO standard cards. The solution encompasses has some key technology features. First, the circuitry is powered and communicates entirely from the NFC reader—meaning no battery. Batteries are problematic in integration, reliability, and have a fixed lifetime. Second, the inlay incorporates, for example, a 10 bit alpha numeric display to show the cardholder anything from how much money is left on their college meal card or pre-paid card, the current balance charged on a credit card, or to display text like "APPROVED" visually showing to the cardholder, the transaction being executed on the mobile phone, computer, or standard payment terminal was processed.

The common Interface—Near Field Communications

NFC is the most promising contactless technology enabling wireless connections between two devices, e.g. a mobile phone and a payment, without having to navigate through complicated menus or performing complex set-up procedures. NFC is already internationally in used between a card & stationary reader for access control and public transport. The principle of NFC is to make two devices communicate and connect based on 13.56 MHz radio frequency technology making it backwards compatible with ISO 14443.

NFC was invented as a communication channel, but when introduced for payment transactions, security had to be added. This is done using a secure micro processor in the card. Thus, it supports almost all of today's major contactless smart cards schemes. NFC-enabled devices can act as both contactless card and reader, supporting peer-to-peer communication.

Figure 3:
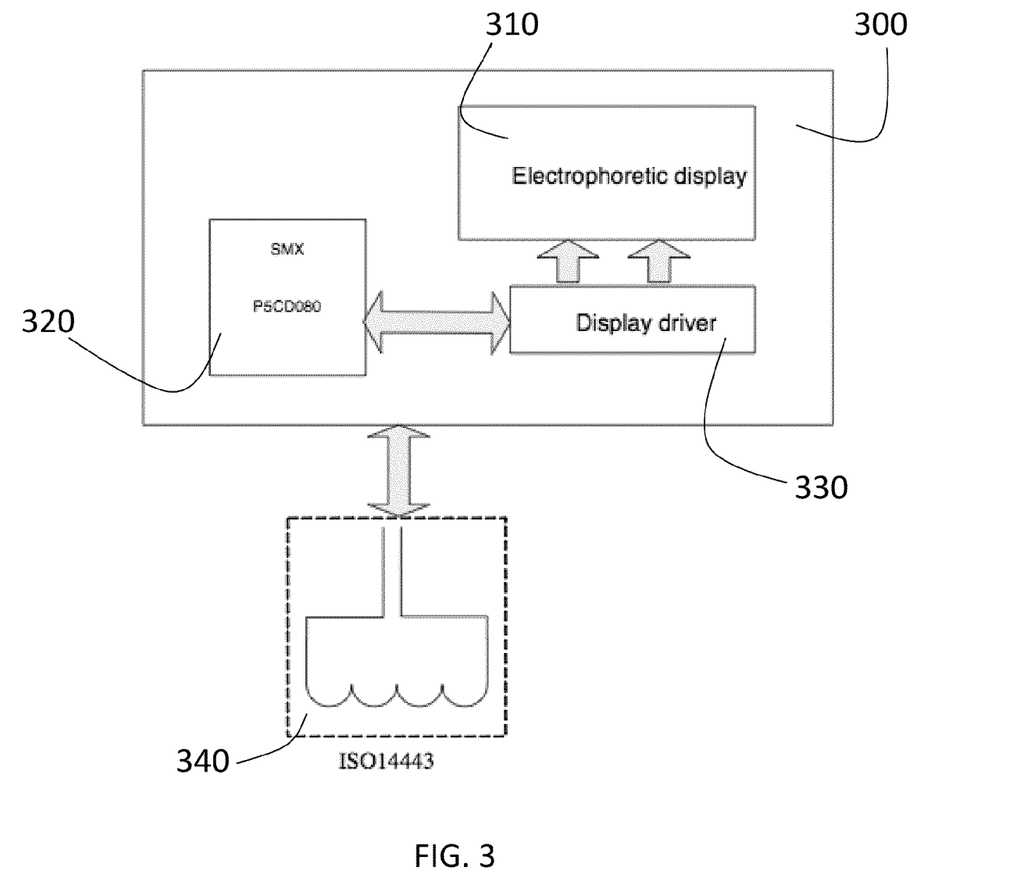
FIG. 3 is a block diagram of a stored value card in accordance with a preferred embodiment of the present invention.

A thin flexible display assembly 300 has circuitry comprised of the functional components in FIG. 3. A bi-state display 310 is changed and update from power & data from the merchants RFID reader payment terminal. The display 310 will stay in the state it was written to until power and data are applied during the next payment or reward redemption transaction. Internal circuitry includes a secure processor 3200 that interfaces with inlay antenna 340 and the drive circuitry 330 for switching the bi-state display 310. The configuration of inlay components does not require an internal battery allowing the display assembly to operate for years. The near field communication (NFC) antenna 340 couples power and data electromagnetically from the coil of the reader to the components within the card 310 that require power, such as the display 310, the driver 330 and the processor 320. Based upon a modulation frequency of 13.45 MHz and using a standard baseband protocol defined as ISO 14443, a preferred embodiment of the invention was designed to work entirely through existing NFC RFID hardware. Internal chip memory encrypts and protects biometrics, user photo or biographical data, flight information, etc.

In a preferred embodiment of the present invention, the display circuitry or assembly 300 is fully encapsulated in a housing formed of a composite layer of Teslin™, and then a polyester plastic. The outer surface of the Teslin is printed using a digital reverse dye sublimation, heat transfer, or any traditional ink process to create the graphics or print on the Teslin. The area were the display 310 is located is cut out in the Teslin. The cutout may be large enough to include all of the lines of the display or there may be a separate cutout for each line of the display. The inlay 300 is attached from the inside and aligned with the cut-out window. The Teslin layer provides excellent thermal barrier from excessive hot & cold temperatures.

The polyester layer serves two functions. First, it provides a transparent or clear protective window on top of the display panel area 3100. Second, it acts a general protective barrier for the circuit display inlay from water and chemicals. The inlay display circuitry shown in FIG. 3 may be modified to facilitate multi-line display as to align with additional data.

The Card

Each NFC system with the card has an antenna with innate capacitive and resistive values which affects the capacity to inductively couple in power and transmit data.

HF antenna—The data read range is very short around 4 inches (10 cm), with a baud rate of 106 kilobaud as defined by the ISO 1443 standard, yet most often read just beyond the actual contact zone of the interrogator.

Antenna

The card is passive because it cannot generate and reflect radio signals to an interrogator if is not in the presence of an electromagnetic (EM) field. The inlay must be inside the interrogation zone in order to receive enough power to generate a response. The initial interrogator signal powers the inlay's circuitry, allowing communication.

The Display

The display in a preferred embodiment is a bi-state display that does not require power to maintain the display after each use. Rather, the display is changed, for example, at the time the card is used. Further, the cards in a preferred embodiment of the present invention may be designed to be interoperable with existing contactless RFID readers and infrastructure.

As shown in FIG. 5A, the display 500 may be, for example, an electrophoretic layer or assembly comprised of a back plane 540, a top plane 550, and an electrophoretic material or layer 560 positioned in between the two. In a preferred embodiment, the bottom plane 540 is an electrical circuit layer and the top plane 550 is a transparent conductive plastic layer. In a preferred embodiment, the display is an E-Ink bistable display based on electrostatic charges used to affect tiny spheres suspended in a plane. The spheres 510 are electrostatically charged with a black half 520 carrying the negative charge and a white half 530 carrying the positive charge. Two electrodes surround the plane; the front one transparent. When a charge is placed across the electrodes the spheres 510 rotate to align with the front-to-back charge gradient.

Because the spheres 510 are suspended in a semi-solid when the power is removed, they remain in that position and the display continues to show whatever design or text it showed before power was removed. Thus, the display does not require any power to keep its visible information. In a preferred embodiment, the display may contain, for example, 10 alphanumeric digits and two decimal points. The software at the secure controller can drive the display through a supplied SW library.

Figure 5B:
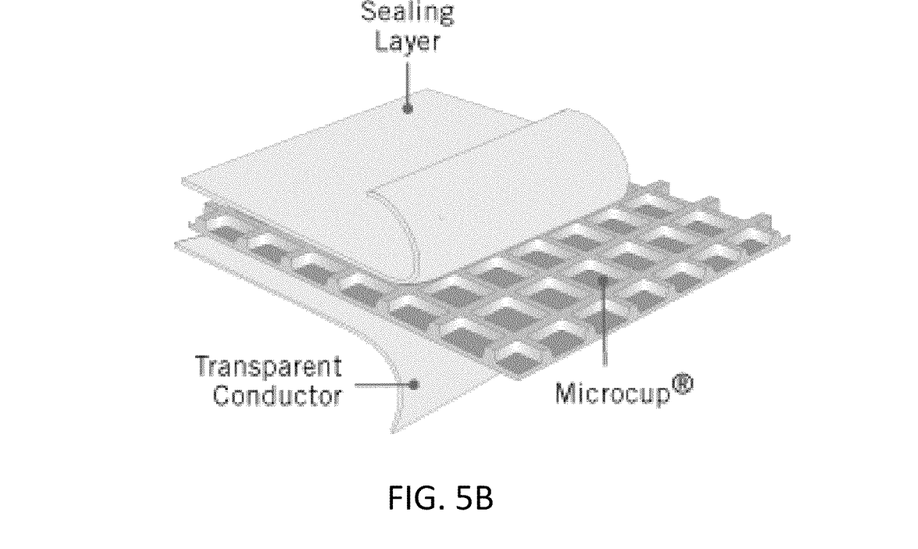
FIG. 5B is a cross sectional view of an electrophoretic bi-state display in accordance with a preferred embodiment of the present invention.

In another embodiment, an SiPix display is used. The SiPix display, shown in FIG. 5B, is a variant of a plastic Electrophoretic display that is thin and flexible and uses a microcup structure to hold electronic ink stable. SiPix's microcup technology involves a microscale container which holds minute quantities of fluid and particles.

The display structure, typically 150 µm thin, is built upon a flexible PET plastic substrate, which may include a transparent conductor such as Indium Tin Oxide (ITO). The contents of the microcup are hermitically sealed to protect them from the environment. Similar electrodes on both either side change position and orientation of material suspending in a gel like fluid. SiPix is also an Electrophoretic a reflective display that uses electrophoresis to switch pixels or segments on and off. Electrophoresis is the motion of charged particles suspended in a liquid in response to an electric field. If the white particles migrate to the visible surface, the display exhibits the color white.

Figure 5C:
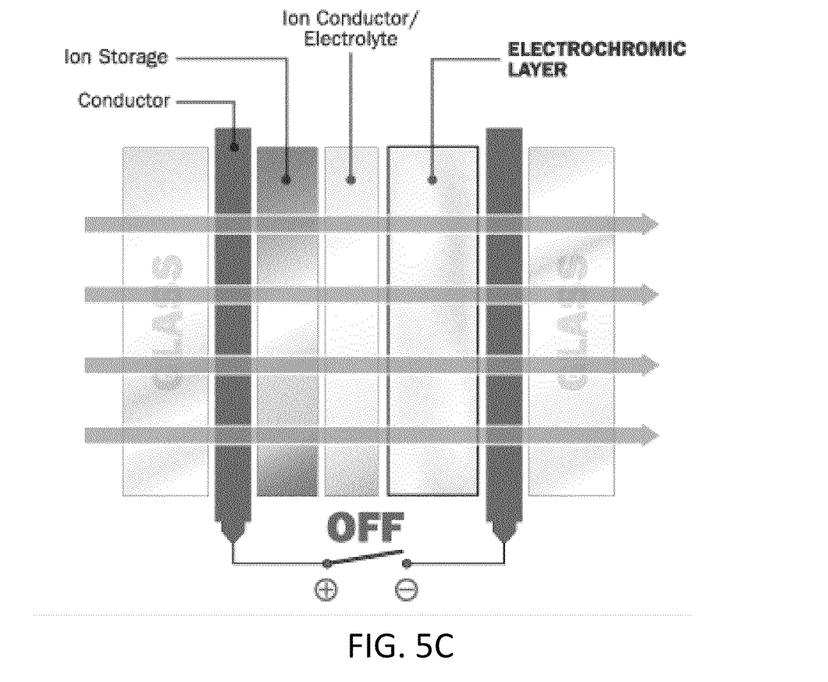
FIG. 5C is a cross sectional view of an electrochromic bi-state display in accordance with a preferred embodiment of the present invention.

In yet another embodiment, the bi-state display is a spiral crystal LCD technology that reflects almost all the image light cast on it while attenuating most of the ambient light to produce a bright reflected display. Cholesteric materials are liquid crystal that is a type of liquid crystal with a helical (smooth curve like a spiral) structure. Cholesteric liquid crystals are also known as chiral nematic liquid crystals have molecules that maintain their orientation. Some substances exist in an odd state that is similar to both liquid and solid. When they are in this state, the molecules tend to maintain their orientation, like solids, but can also move like a liquid. Liquid crystals are such materials. However, in essence they are more like a liquid and require only a little heat to move from this odd state to a liquid state. A feature of liquid crystals is that they are affected by electric currents. Depending on the temperature and particular nature of a substance, liquid crystals can be in one of several distinct phases, including nematic phase and the cholesteric phase. LCDs use these types of crystals because they react predictably to electric current in such a way as to control light passage In still another embodiment, an electrochromic display is used. The display is comprised of a layer of electrochromic material sandwiched between two electrode layers, as shown in FIG. 5C. The material changes from one color to another when stimulated by an electric current. The top electrode layer is made from transparent plastic, so the display can be seen clearly through it.

The chemical reaction at work is an oxidation reaction—a reaction in which molecules in a compound lose an electron. Ions in the sandwiched electrochromic layer are what allow it to change from opaque to transparent. It's these ions that allow it to absorb light. A power source is wired to the two conducting oxide layers, and a voltage drives the ions from the ion storage layer, through the ion conducting layer and into the electrochromic layer. This makes the glass opaque. By shutting off the voltage, the ions are driven out of the electrochromic layers and into the ion storage layer. When the ions leave the electrochromic layer, the window regains its transparency.

Thickness

The maximal thickness of the module, its components and the display is about 300 micro meter, except for some SMD components that have a thickness of 400 micrometer. The thickness is very suitable for embedding in a standard ISO thickness card (800 micron).

Materials

Figure 4:
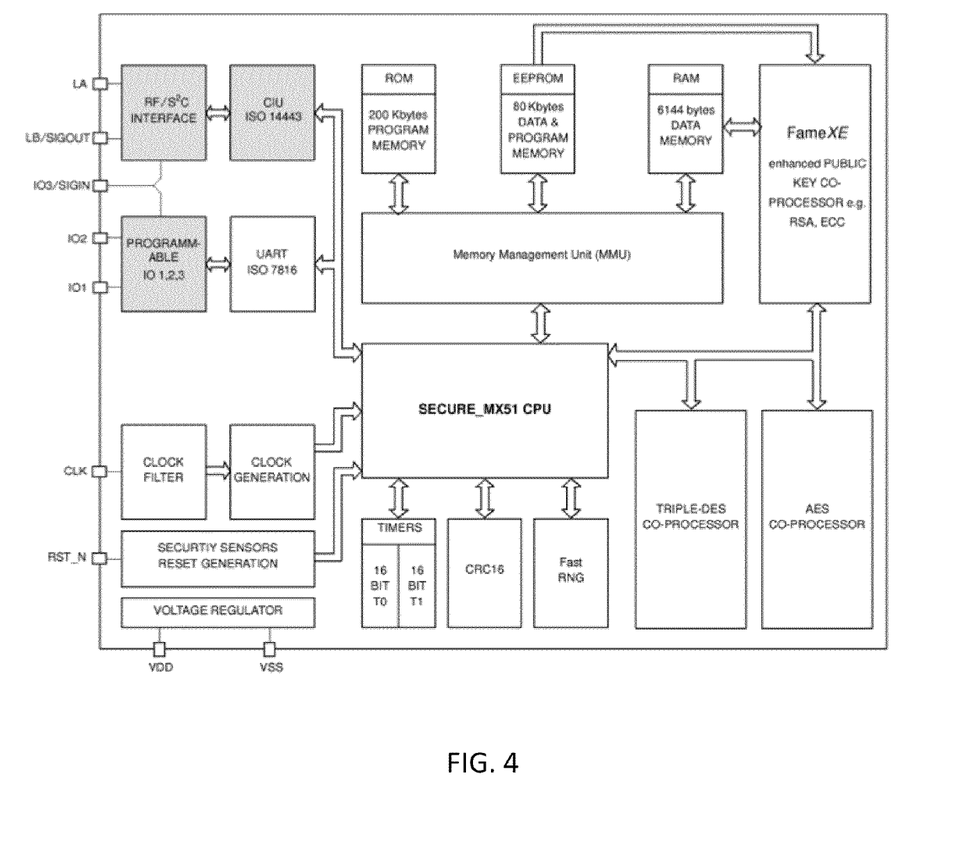
FIG. 4 is a block diagram of a security processor in a preferred embodiment of the present invention.

Inlay: FR-4 (glass-epoxy-laminate) thickness: 100 micron (excluding copper tracks) Module base material: Polyimide, thickness: 25 micron Display front material: PET (Polyethylene Therephthalate), thickness: 125 micron Note: all materials have a CTE (Coefficient of Thermal Expansion) of ±18 ppm/oC Secure Processor:

A block diagram of an exemplary security processor of the secure display device is shown in FIG. 4. The security processor includes 96 Kbytes of ROM, 4608 bytes of RAM (data memory) and 18 Kbytes of EEPROM, which can be used as data memory and as program memory. On-chip program memory has up to 8 Mbytes and additional instructions has been added to the 8051 instruction set to support the extended addressing concept and improve the code efficiency with C programming.

Interface execution speed and enhanced functionality and expanded on-chip memory configurations of more than 500 Kbytes. Functions including the operation of DES and AES are fully operational on the contactless interface.

The contactless interface data, processing data within the card, and data storage are protected with an embedded security processor with an international assurance rating of EAL+5 (Evaluation Assurance Level) based upon the common criteria for information security. This security assurance can only be achieved with a series of hardware/software features.

Interface to any security authentication protocol or encryption systems are easily achieved through non-proprietary firmware on the processor.

Security Features to Achieve EAL+5 include, but are not limited to, the following:

Supports public key cryptography based on finite fields of prime order—GF(p)

Supports RSA with an operand length of up to 5 kBits and related standards (PKC#1 [RSA], PKC#3 [Diffie-Hellman] and FIPS 186-2 [DSA&EC-DSA], IEEE P1363).

An integrated Hardware 3DES accelerated in incorporated into the processor chip DES3 performance: <50 µs. The Digital Encryption Standard (DES) for symmetric encryption is still used in most applications today and is supported by a dedicated, high performance, highly attack resistant co-processor. Single DES and triple DES, based on two or three DES keys, can be executed within less than 50 µs. Relevant standards (ISO, ANSI, FIPS) and Message Authentication Code (MAC) are fully supported. The use of the embedded DES co-processor increases execution speeds to a level where the actual time needed for a DES encryption becomes entirely irrelevant for an application.

To further protect and prevent reading while encrypting data or while in memory, countermeasures incorporate a range of security features to counter measure side channel attacks like DPA, SPA etc.

A Low power Random Number Generator (RNG) is implemented in hardware, FIPS140-2 compliant Power-up/Power-down reset•Low/high supply voltage sensor•Low/high clock frequency sensor•Low/high temperature sensor•Light sensor•Single Fault Injection (SFI) attack detection•EEPROM programming:
No external clock—hardware sequencer controlled—on-chip high voltage generation
Electronic fuses for safeguarded mode control
Unique serial number for each die
32 bytes Write Once Security area in EEPROM (bit access)
14 bytes User Write Protected Security area in EEPROM (byte access, inhibit functionality per byte)
32 bytes User Read Only area in EEPROM (byte access)
64 or 128 EEPROM bytes for customer-defined Security FabKey. Featuring batch-, wafer- or die-individual security data, incl. encrypted diversification features on request
Clock Input Filter for protection against spikes
Memory protection (encryption and physical measures) for RAM, EEPROM and ROM The inlay integrates the SmartMX are microprocessor. The hardware does nothing on its own, it has to be programmed with dedicated software—an operating system. Most of the time, the microprocessor is coupled to a co-processor dedicated to fast cryptographic computations (i.e, Triple DES or AES). The processor capable of executing complex operations that are as secure and fast as operations on contact based cards and slower through the RFID interface. Both the contact or multiple interfaces can be connected. The processor is capable of supporting a range of both proprietary and open operating systems, including the Java Card™ operating system (JCOP).

Depending on the installed software, this processor is mostly used where a high level of security is required (i.e., secure travel documents, electronic passports, payment cards, etc.), and is certified by independent parties such as Common Criteria. The hardware of the SmartMX processor is Common Criteria certified at EAL5+ by the BSI, which means that it is highly resistant to tampering such as, for instance, reverse engineering attacks, fault/glitch attacks, or power analysis attacks.

NFC is the preferred interface for mobile payments for ease of use between credit cards or bank card. FIG. 2B illustrates next generation web enabled phones and computers with integrated NFC communications hardware. This will allow the mobile device and computers to act as a secure payment terminal.

Figure 6:
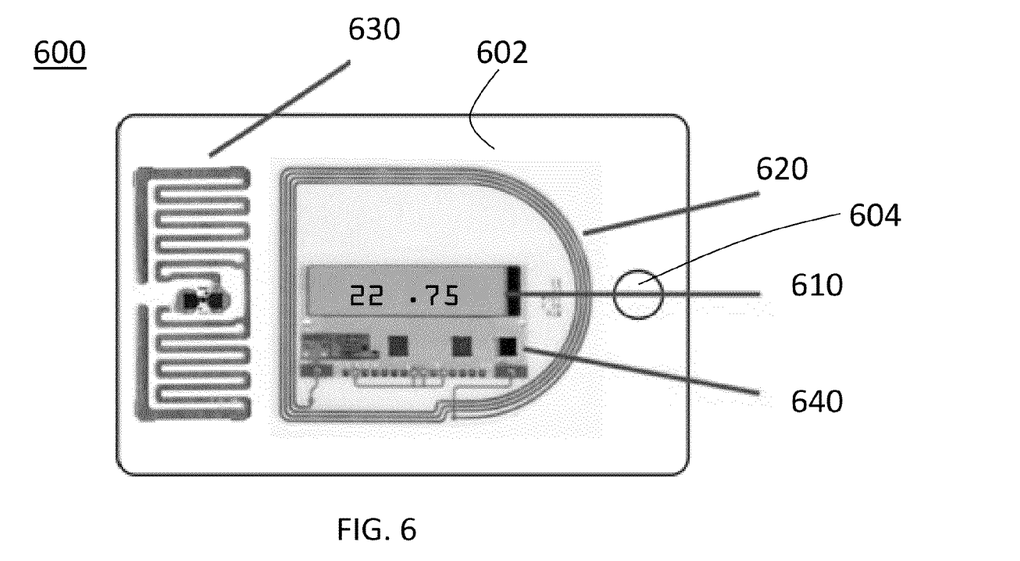
FIG. 6 is a diagram of an embodiment in accordance with the present invention of an RFID card having two antennas.

In another embodiment of the present invention, the RFID card has both a near-field antenna and a UHF antenna. In such a system, the UHF antenna may be used solely for reading information while the near-field antenna can be used to change the display. As shown in FIG. 6, the card 600 has both a near-field antenna 620 and a UHF antenna 630. In such a system, the UHF antenna 620 may be used solely for reading information while the near-field antenna 630 can be used to provide power to change the display 610 via driver chips 640 and to power the processor and memory. In FIG. 6, there also is shown an opening or hole 604 in housing 602, for example, for attaching said card to a key chain or other item. For example, DASH7, a wireless sensor network protocol, uses 433 MHz, a much lower frequency that travels further with less interference. DASH7 has a multi-kilometer range and with penetration of walls, floors, and water, has a maximum bitrate of 200 kbps, supports tag-to-tag or "multi-hop" communications, sensors, and public key encryption. The shortfalls of DASH7 are that it still requires a battery, it does not support 2-way communications and it is less secure then the passive NFC interface. This DASH7 technology would be an additional option for the UHF antenna.

The card or tag 600 may be encapsulated using commercially available techniques such as used by Vanguard Identification Systems, Inc. in Westchester, Pa. (see also, U.S. Pat. No. 7,584,896). Other encapsulating techniques may be used. For example, the Innovatier Corp. (Lakeland Fla.) encapsulation process is both low-temperature and low pressure not damaging the circuitry or display. The process utilizes a flexible urethane elastomer material that becomes structurally integral with the electrical components and display. This process is called Reaction Assisted Injection Molding Process (RAMP) and allows the delivery of gram-level quantities of reaction injection molding material reliably and accurately. Other attributes of RAMP include:

The manufacturing process is a Low-temperature and low-pressure technology can over mold components at 50° C. and less than 25 psi (1.7 Bar)
The "cold" process does not utilize high temperature to activate a bond of the core layer to the overlays, which helps eliminate damage to sensitive electronics.
The urethane elastomeric material embeds materials to flow gaps as small as 0.0005" with no out gassing which generate localize stress points.
The Highly durable elastomeric core formulations further proved to be extremely, durable and almost impossible to remove without damage
Other process strengths are, low viscosities, minimal injection forces, low shrinkage, and conducive to high-speed manufacturing.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A batteryless RFID card comprising:
a housing having a window;
a secure processor in said housing, said secure processor having internal chip memory in which encrypted data is stored;
a near-field antenna in said housing; and
a bi-state display in said housing for displaying alphanumeric information through said window, wherein said display comprises a multi-digit alphanumeric display;
wherein said RFID card has no battery and said processor and said display are solely powered by energy received through said near-field antenna and are powered only while said near-field antenna is coupled to a reader and wherein alphanumeric information is displayed on said display using power from energy received through said near-field antenna, said display is changed only while said card is coupled to said reader and said displayed alphanumeric information is maintained on said display when said power from energy received through said near-field antenna is discontinued and alphanumeric information displayed on said display is changed multiple times to produce a scrolling or multiline message on said display when said near-field antenna is coupled to a reader; and wherein a remaining monetary value is stored in memory on said card and said displayed alpha-numeric information comprises a remaining monetary value.

2. A batteryless RFID card according to claim 1 further comprising driver circuitry in said housing for driving said display.

3. A batteryless RFID card according to claim 1 further comprising a memory in said housing and connected to said processor, wherein said memory is powered solely by energy received through said near-field antenna.

4. A batteryless RFID card according to claim 1 wherein said display comprises a ten-digit alphanumeric display.

5. A batteryless RFID card according to claim 1 wherein said bi-state display comprises an electro-chromic display.

6. A batteryless RFID card according to claim 1 wherein said bi-state display comprises an electro-phoretic display.

7. A batteryless RFID card according to claim 1 wherein said bi-state display comprises a cholesteric display.

8. A batteryless RFID card according to claim 1 wherein said bi-state display comprises an E-Ink display.

9. A batteryless RFID card according to claim 1 further comprising a UHF antenna for reading data from said RFID card.

10. A method for displaying a monetary value on an RFID stored value card having a secure processor, a memory, a multi-digit bi-state display and a near-field antenna, comprising the steps of:
coupling said RFID stored value card to an RFID reader through said near-field antenna;
powering said secure processor solely with energy received through said near-field antenna while said RFID stored value card is coupled to said RFID reader;
executing a cryptographic challenge in said secure processor in response to said coupling of said card to said reader to mutually authenticate said card and said reader;
retrieving with said secure processor a remaining monetary value from said memory while said RFID stored value card is coupled to said RFID reader;
calculating a new remaining monetary value with said secure processor based upon a transaction, wherein said calculating is performed only while said RFID stored value card is coupled to said RFID reader;
storing said new remaining monetary value in said memory, wherein said storing is performed only while said RFID stored value card is coupled to said RFID reader; and
changing said multi-digit bi-state display to display said new remaining monetary value using solely energy received through said near-field antenna and only while said RFID stored value card is coupled to said RFID reader;
wherein the step of changing alphanumeric information displayed on said multi-digit bi-state display comprises changing displayed alphanumeric information multiple times to produce a scrolling or multiline message on said display; and
wherein a remaining monetary value is stored in memory on said card and said displayed alpha-numeric information comprises a remaining monetary value and wherein a remaining monetary value is stored in memory on said card and said displayed alpha-numeric information comprises a remaining monetary value.

11. A method for displaying a remaining monetary value on an RFID stored value card according to claim 10, wherein said transaction comprises adding a specified amount to said stored remaining monetary value.

12. A method for displaying a remaining monetary value on an RFID stored value card according to claim 10, wherein said transaction comprises subtracting a specified amount to said stored remaining monetary value.

13. A method for displaying alphanumeric information on an RFID card having a secure processor, a memory, a multi-digit bi-state display and a near-field antenna, comprising the steps of:
coupling said RFID card to an RFID reader through said near-field antenna;
powering said secure processor exclusively with energy received through said near-field antenna and only powering said processor while said RFID card is coupled to said RFID reader through said near-field antenna;
conducting a secure transaction using said card only while said RFID card is coupled to said RFID reader through said near-field antenna;
changing alpha-numeric information displayed on said multi-digit bi-state display exclusively using energy received through said near-field antenna and only while said RFID card is coupled to said RFID reader to display information reflecting a status of said secured transaction; and
maintaining alpha-numeric information displayed on said bi-state display after said RFID card is decoupled from said RFID reader;
wherein the step of changing alphanumeric information displayed on said multi-digit bi-state display comprises changing displayed alphanumeric information multiple times to produce a scrolling or multiline message on said display; and
wherein a remaining monetary value is stored in memory on said card and said displayed alpha-numeric information comprises a remaining monetary value.

14. A method for displaying alphanumeric information on an RFID card according to claim 13, wherein said step of changing alphanumeric information displayed on said display comprises displaying a status of at least one of the following: a payment process, an authentication process, a cryptographic process, a mutual authentication process, a challenged response process, a coupon redemption process or an awards process.

15. A method for displaying alphanumeric information on an RFID card according to claim 13, wherein said step of changing alphanumeric information displayed on said display comprises displaying an entertainment message.

* * * * *